(12) United States Patent
Parrella et al.

(10) Patent No.: US 6,507,764 B1
(45) Date of Patent: Jan. 14, 2003

(54) NETWORK OF DIGITAL BROADCAST STATIONS

(75) Inventors: Micahel J. Parrella, Weston, CT (US); Irene Lebovics, Wilton, CT (US)

(73) Assignee: NCT Group, Inc., Westport, CT (US)

( * ) Notice: Subject to any disclaimer, the term of this patent is extended or adjusted under 35 U.S.C. 154(b) by 0 days.

(21) Appl. No.: 09/281,086

(22) Filed: Mar. 30, 1999

(51) Int. Cl.[7] .............................................. G06F 17/00
(52) U.S. Cl. ........................................ 700/94; 709/200
(58) Field of Search ............................ 700/94; 381/61; 725/116; 709/200, 203, 208, 206, 217, 218; 704/270, 278

(56) References Cited

U.S. PATENT DOCUMENTS 5,659,350 A * 8/1997 Hendricks et al. .......... 725/116

* cited by examiner

Primary Examiner—Xu Mei
(74) Attorney, Agent, or Firm—R. Michelle Larson

(57) ABSTRACT

A network of centrally controlled, customizable digital broadcast stations capable of broadcasting music, videos, audible advertisements, and visual advertisements is disclosed. The invention includes a program database, a station demographic database, a central controller, and a plurality of digital broadcast stations. The central controller includes one or more servers, multiple computer workstations, and multiple call directors. Each digital broadcast station includes a computer, a loudspeaker(s), and a microphone. Optionally, a digital broadcast station may include a projector(s) or flat screen television(s). The central controller completely controls the broadcast content and broadcast schedule of the plurality of digital broadcast stations. The present invention allows advertisers to conduct targeted advertising campaigns within the network of digital broadcast stations.

38 Claims, 4 Drawing Sheets

NETWORK OF DIGITAL BROADCAST STATIONS

FIELD OF THE INVENTION

The present invention relates to a network of centrally controlled, customizable digital broadcast stations capable of broadcasting music, videos, audible advertisements, and visual advertisements. The present invention especially relates to a system for (1) marketing music and videos; (2) distributing music, videos, audible advertisements, and visual advertisements throughout a network of digital broadcast stations; and (3) controlling the broadcast schedule of music, videos, audible advertisements, and visual advertisements for a network of digital broadcast stations using a central controller.

BACKGROUND OF THE INVENTION

Businesses routinely use music to create a certain environment for their customers. Several companies offer continuous background music to commercial establishments using satellites or transmission towers. For example, MUZAK offers numerous channels of programmed music to commercial establishments that subscribe to its service. A major deficiency of a system like MUZAK is the programming cannot be customized for a particular establishment.

A customizable background music system is disclosed in U.S. Pat. No. 5,726,909 entitled Continuous Play Background Music System issued to Krikorian. The system described in U.S. Pat. No. 5,726,909 contains a central computer that is in communication with a number of end user computers having audio output means. The central computer stores a master library of musical selections and announcements, and the end user computers request the musical selections and announcements stored in the central computer.

Today's business owners need more than continuous background music. They require a complete multimedia experience that can appeal to the various senses of their customers. The present invention can provide such an experience.

SUMMARY OF THE INVENTION

The present invention is a network of centrally controlled, customizable digital broadcast stations capable of broadcasting music, videos, audible advertisements, and visual advertisements. The invention includes a program database, a station demographic database, a central controller, and a plurality of digital broadcast stations. The central controller includes one or more servers, multiple computer workstations, and multiple call directors. Each digital broadcast station includes a computer, a loudspeaker(s), and a microphone. Optionally, a digital broadcast station can include a projector(s) or flat screen television(s). The central controller completely controls the broadcast content and broadcast schedule of the plurality of digital broadcast stations.

An important aspect of the present invention is its ability to allow advertisers to conduct targeted audible and visual advertising campaigns within the network of digital broadcast stations. When a digital broadcast station is installed in a new venue, a statistical profile is compiled for that venue. The statistical profile contains information about the persons who visit the venue. Statistical profiles for every venue that has a digital broadcast station installed are included in the station demographic database. Using the station demographic database, advertisers can determine which digital broadcast stations carry their advertisements and what day(s) and time(s) the advertisements run. All an advertiser has to do is input a desired characteristic(s) for the target audience, and the invention automatically identifies the digital broadcast stations that satisfy the required criteria along with the best day(s) and time(s) to run the advertisements.

It is an object of the invention to provide a digital broadcast station that can broadcast audio and video information without satellites or transmission towers.

It is another object of the invention to provide a network of digital broadcast stations that can be completely controlled from a central controller.

It is yet another object of the invention to provide a system that allows advertisers to strategically select which digital broadcast stations carry their advertisements and what day(s) and time(s) the advertisements are broadcast.

It is still another object of the invention to provide a system capable of delivering a complete multimedia experience which includes coordinated audio and video programming designed to accentuate advertisements and entertainment in commercial establishments and other similar venues.

It is another object of the invention to use a microphone signal to verify that the proper programming has been broadcast and to adjust the gain of the audio output signal depending on the environmental conditions.

It is yet another object of the invention to use a text-to-speech system in conjunction with the present invention to minimize the production costs associated with audible programming.

DESCRIPTION OF THE INVENTION

Figure 1:
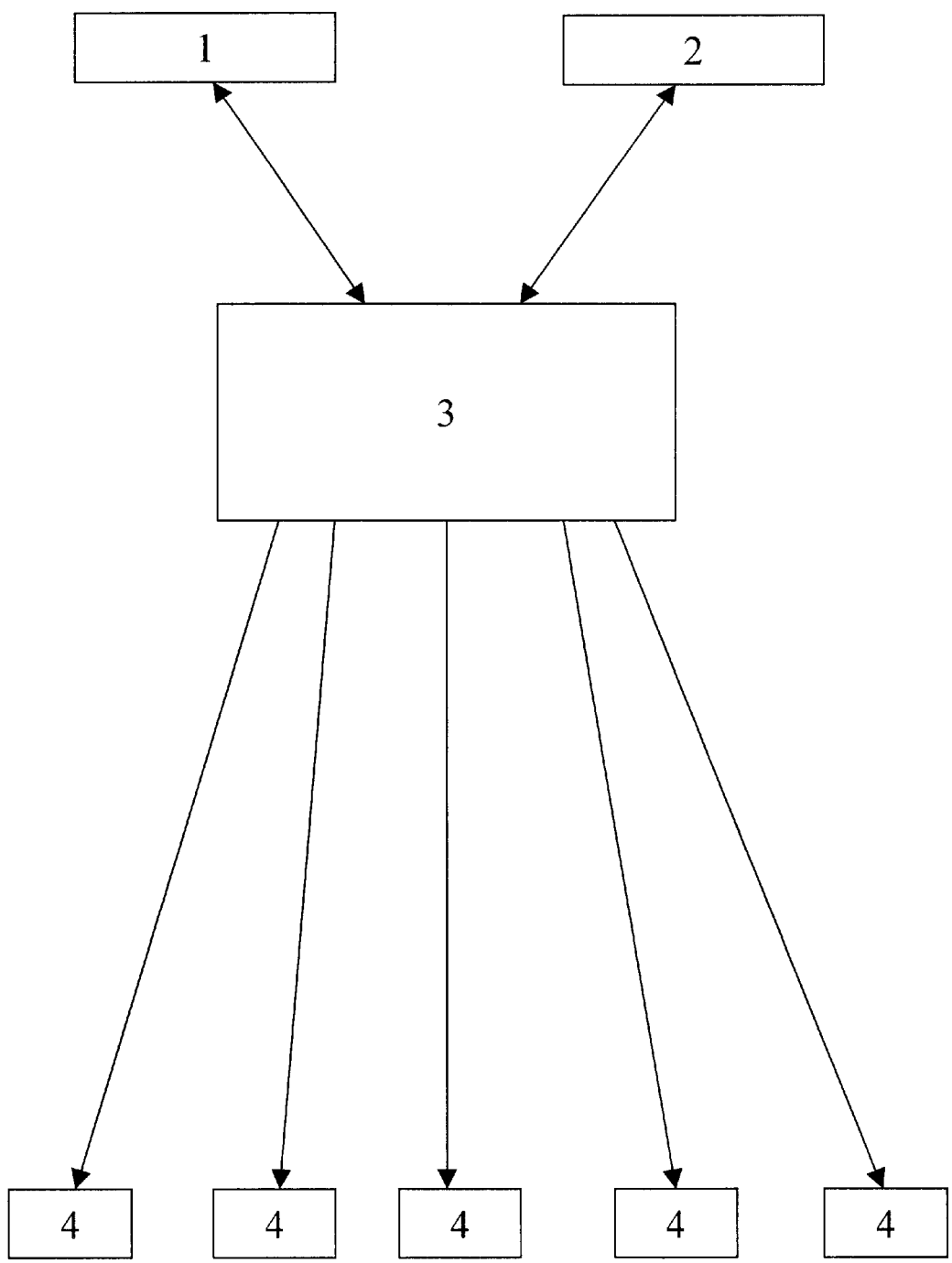
FIG. 1 illustrates a network of digital broadcast stations according to the present invention.

As shown in FIG. 1, the network of the present invention comprises a program database 1, a station demographic database 2, a central controller 3, and a plurality of digital broadcast stations 4. The program database 1 contains all of the music and videos licensed for use with the present invention. Audible advertisements and visual advertisements are also stored in the program database 1. The program database 1 is created using existing media like CD-ROMs, audiotapes, etc. The music, videos, audible advertisements, and visual advertisements are stored in the program database 1 using an encrypted, MP3 format that is well known to those skilled in the art.

The station demographic database 2 includes statistical profiles for every venue that has a digital broadcast station 4 installed. A statistical profile contains information such as the age, gender, race, etc. of persons in a particular venue on specific days and at certain times of the day.

Figure 2:
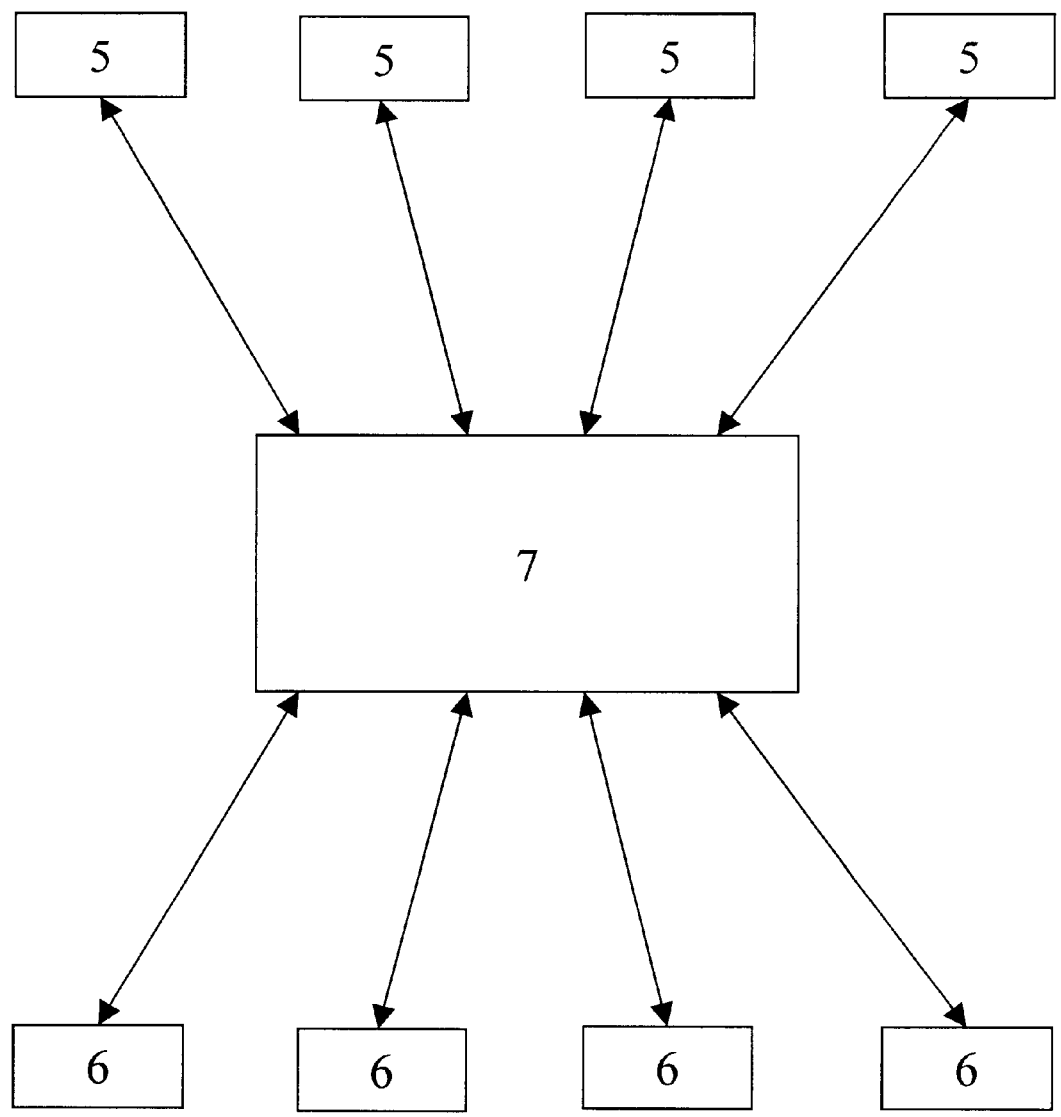
FIG. 2 is a diagram of a central controller according to the present invention.
Figure 3:
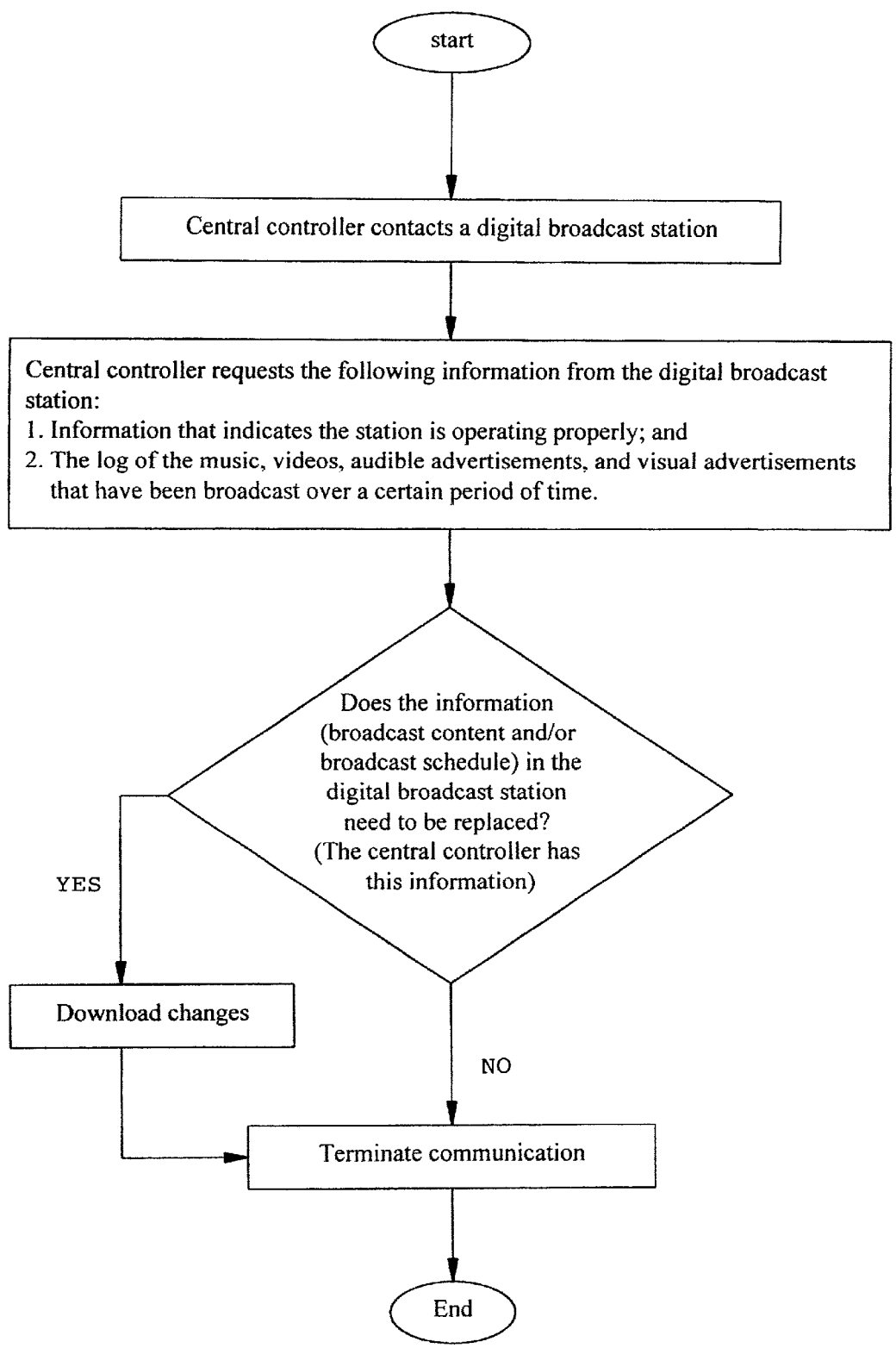
FIG. 3 is a flow diagram illustrating the functions performed by the central controller.

The central controller 3 is operatively connected to both the program database 1 and the station demographic database 2. As shown in FIG. 2, the central controller 3 includes one or more servers 7, multiple computer workstations 5, and multiple call directors 6. The central controller 3 performs the following functions (See FIG. 3):

1) insures each digital broadcast station is operating properly;
2) requests a log of the music, videos, audible advertisements, and visual advertisements broadcast over a certain period of time from each digital broadcast station in the network;
3) checks to see if any changes need to be made to the broadcast content and/or broadcast schedule for each digital broadcast station in the network; and
4) changes the broadcast content and/or broadcast schedule of the digital broadcast stations as required.

Figure 4:
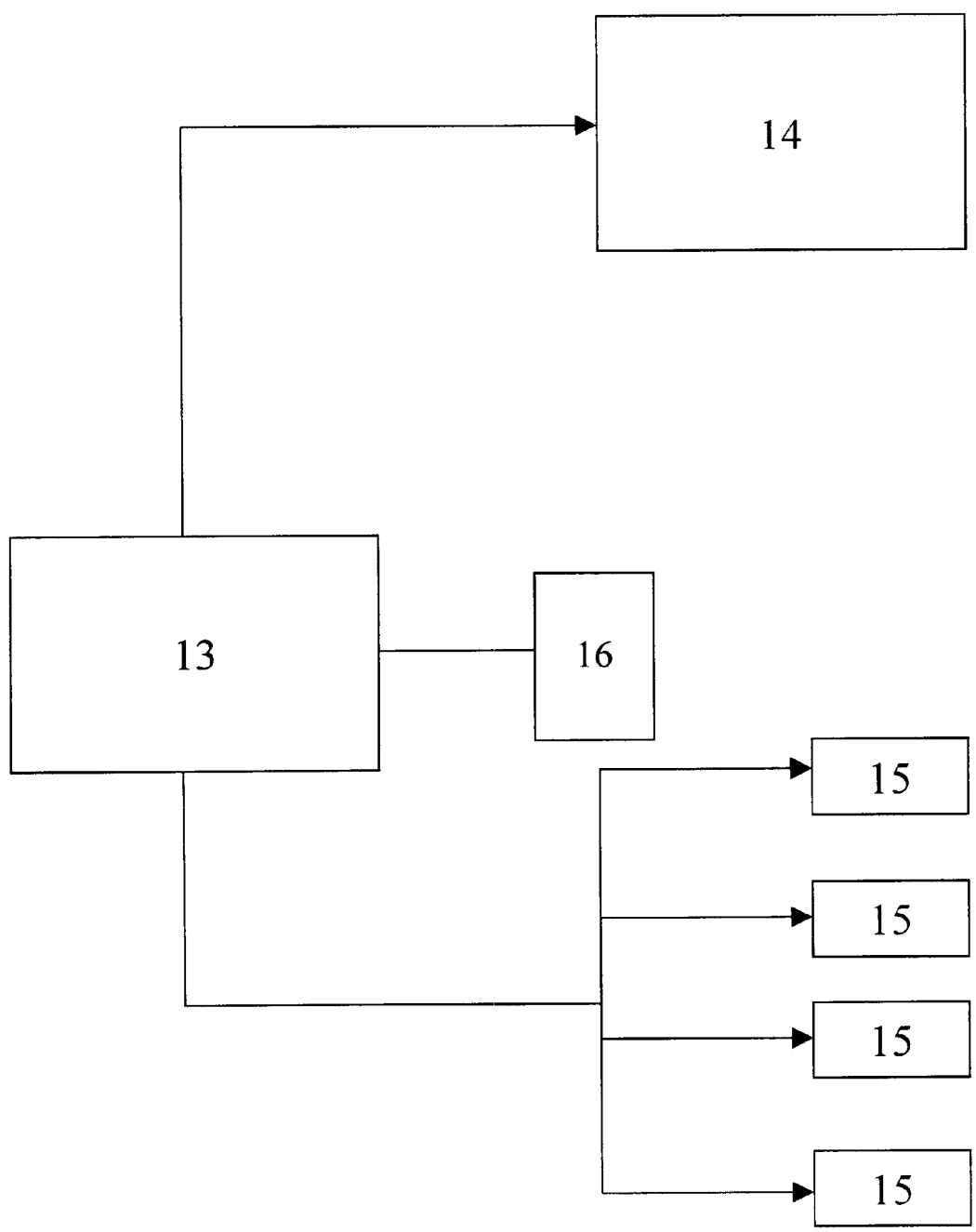
FIG. 4 shows a digital broadcast station according to the present invention.

The central controller 3 is in communication with a plurality of digital broadcast stations 4. FIG. 4 shows a digital broadcast station 4 according to the present invention. Each digital broadcast station 4 includes a PC 13 or other controller, one or more loudspeakers 15, and a microphone 16. The digital broadcast station 4 may include one or more projectors 14 or flat screen televisions. The one or more loudspeakers 15 can be covered with a visual advertisement. Audible advertisements can be broadcast over the one or more loudspeakers 15 that relate to the visual advertisement on the speaker(s). The one or more loudspeakers 15 can also be flat.

In a preferred embodiment of the invention, the digital broadcast station 4 includes a 333 MHz processor, 128 Mb of RAM, 16.6 GB of hard drive to store music, 1 GB of hard drive to store information associated with the various databases, a 56 K modem, a CD ROM drive, a backup battery, a sound card, and a floppy disk drive. Optionally, 16.6 GB of hard drive can be included for video, and a LAN card can be used in lieu of a modem.

Each digital broadcast station 4 in the network provides site specific, broadcast programming. The broadcast programming can consist of any combination of music, videos, audible advertisements, and visual advertisements. Each digital broadcast station 4 uses tables and databases to control the broadcast schedule of information stored in the PC 13.

Before a digital broadcast station 4 is installed in a particular venue, broadcast content from the program database 1 must be loaded onto the hard drive of the digital broadcast station 4. The broadcast content can consist of any combination of music, videos, audible advertisements, and visual advertisements. After the initial information is stored on the hard drive of the digital broadcast station 4, all subsequent changes are downloaded from the central controller 3. Changes to the broadcast schedule are also made from the central controller 3 by modifying the tables and databases in the digital broadcast station 4. All of the information stored on the hard drive of the digital broadcast station 4 is encrypted to prevent theft, and each digital broadcast station 4 has its own, unique encryption key to unlock the stored information.

The computer workstations 5 of the central controller 3 are used to input changes to the broadcast content and/or broadcast schedule for each of the digital broadcast stations 4 in the network. If a digital broadcast station 4 requires new content, the server 7 accesses the program database 1, retrieves the appropriate information, and then downloads the information to the proper digital broadcast station 4 at an appropriate time. The downloaded information is encrypted according to methods that are well known in the art.

Although the broadcast content information downloaded to a digital broadcast station 4 will generally consist of wave files, the invention does encompass downloading text files to a digital broadcast station 4 and using a text-to-speech system to produce audio output. The text-to-speech system can be used to announce news, press releases, song titles, etc. Audible advertisements can also be broadcast using the text-to-speech system. The key benefit derived from broadcasting audible advertisements using the text-to-speech system is the advertisements are produced instantaneously. A wave file representation of an audible advertisement requires a costly and time consuming production process.

Live programming can be substituted for the scheduled programming of a digital broadcast station 4 at any time. When live programming is required at a specific digital broadcast station 4, the central controller 3 overrides the scheduled programming of the affected digital broadcast station 4. Live programming is then received directly from a communications link like the Internet.

While each digital broadcast station 4 broadcasts information, it creates a log. A microphone 16 at each digital broadcast station 4 monitors the broadcast information. Using waveform correlation, the information received at the microphone 16 is used to verify that the proper programming has been broadcast. In addition to verifying broadcast content, the microphone 16 can be used to monitor the environmental conditions so the gain of the audio output signal fed to the loudspeakers 15 can be adjusted accordingly.

A key aspect of the present invention is its ability to allow advertisers to conduct targeted advertising campaigns. Based on the information contained in the station demographic database 2, advertisers can determine which digital broadcast stations 4 carry their advertisements and what day(s) and time(s) the advertisements run.

The various ways the digital broadcast stations 4 in the network can be organized also facilitates targeted advertising campaigns. One way of organizing the digital broadcast stations 4 in the network involves classifying them by market, type, sub-type, demographics, geography, etc. For example, digital broadcast stations 4 can be grouped into the following markets: health care, sports and fitness, restaurants and bars, lodging, etc. The markets can be broken down into types. For example, the health care market can be divided into doctor's offices, clinics, medical centers, pharmacies, hospitals, etc. The types can be broken down into sub-types. For example, hospitals can be divided into waiting rooms, cafeterias, etc. This type of organization helps advertisers determine which digital broadcast stations 4 broadcast to their desired audience.

Another way of organizing the digital broadcast stations 4 in the network involves placing them in logical groups. A logical group is a group of digital broadcast stations 4 that share a specified characteristic(s). The characteristic(s) can be defined by advertisers to conduct targeted advertising campaigns. For example, if an advertiser wants an audience of females between the ages of 20 and 23, all he needs to do is enter that criteria at one of the computer workstations 5 of the central controller 3. The computer workstation 5 will automatically display which digital broadcast stations 4 have the largest audience of females between the ages of 20 and 23 along with the days and times that the largest number of the desired audience is present.

The following is just one example of how a targeted advertising campaign can be carried out using the present invention. Let's say an advertiser wants an audience of males between the ages of 18 and 34 who like professional football. More than likely, men in sports bars between 1 PM and 7 PM on Sundays during the fall are there to watch professional football games. Since these men are in sports bars to watch football games, it is probably safe to assume they like professional football. Using the present invention, the advertiser can easily identify sports bars that have digital broadcast stations installed and which of these sports bars have the largest audience of males between the ages of 18 and 34 from 1 PM and 7 PM on Sundays during the fall. In this manner, advertisers can select the best venues and times to run their advertisements.

What is claimed is:

1. A network having a plurality of centrally controlled, customizable digital broadcast stations, wherein the network comprises:

the plurality of digital broadcast stations, installed in one or more venues, capable of broadcasting any combination of music, videos, audible advertisements, and visual advertisements, wherein each broadcast station of the plurality of digital broadcast stations comprising a computer, a microphone, and one or more loudspeakers and wherein each broadcast station is operable to download and store programming;

a program database that comprises programming containing all of the music, videos, audible advertisements, and visual advertisements available to be broadcast by one or more of the plurality of digital broadcast stations;

a station demographic database that comprises one or more statistical profiles corresponding to the one or more venues in which the plurality of digital broadcast stations are installed; and a central controller operatively coupled to said plurality of digital broadcast stations, said program database and said station demographic database, wherein said central controller selectively controls content and scheduling of the programming broadcast by said plurality of digital broadcast stations in accordance with the one or more statistical profiles of the station demographic database corresponding to the one or more venues in which the plurality of digital broadcast stations are installed and wherein each digital broadcast station is operable to exercise selective local control in the playing of said content.

2. A network according to claim 1 where said central controller comprises one or more servers, one or more computer workstations, and one or more call directors.

3. A network according to claim 1 where said central controller is located remotely from said plurality of digital broadcast stations.

4. A network according to claim 1 where said central controller receives a log of the music, videos, audible advertisements, and visual advertisements broadcast over a certain period of time from each digital broadcast station.

5. A network according to claim 1 where said central controller receives information indicating that each digital broadcast station is operating properly.

6. A network according to claim 1 where said central controller downloads any combination of music, videos, audible advertisements, and visual advertisements stored in said program database to one or more of said plurality of digital broadcast stations.

7. A network according to claim 1 where said central controller downloads information to one or more of said plurality of digital broadcast stations that alters the broadcast schedule.

8. A network according to claim 1 where said central controller downloads text files to one or more of said plurality of digital broadcast stations which are translated by a text-to-speech system at said digital broadcast station(s).

9. A network according to claim 8 where the text files are advertisements that can be produced instantaneously.

10. A network according to claim 8 where the text files announce or describe the broadcast programming.

11. A network according to claim 2 where the one or more computer workstations can access one or more of the broadcast content, broadcast schedule, and advertisement availability for each digital broadcast station.

12. A network according to claim 2 where the one or more computer workstations can display a list of the digital broadcast stations that share a specified characteristic(s).

13. A network according to claim 1 where said plurality of digital broadcast stations are organized according to one or more of markets, types, sub-types, demographics, geography of said plurality of digital broadcast stations.

14. A network according to claim 1 where said plurality of digital broadcast stations are organized according to logical groups.

15. A digital broadcast station capable of broadcasting any combination of music, videos, audible advertisements, and visual advertisements that can be administered by a remote central controller, comprising:

a computer that stores programming comprising any combination of music, videos, audible advertisements, and visual advertisements received from the remote central controller, said received programming determined in accordance with a statistical profile of a venue in which the digital broadcast station is installed;

means for accessing the central controller operatively attached to said computer;

one or more loudspeakers attached to said computer; and a microphone attached to said computer wherein the digital broadcast station is operable to exercise selective local control of the broadcast of the programming in accordance with a schedule received from the remote central controller and determined in accordance with the statistical profile of the venue of the digital broadcast station.

16. A digital broadcast station according to claim 15 further comprising one or more projectors or flat screen televisions attached to said computer.

17. A digital broadcast station according to claim 15 where said one or more loudspeakers are covered by visual advertisements.

18. A digital broadcast station according to claim 15 where said one or more loudspeakers are flat loudspeakers.

19. A digital broadcast station according to claim 15 where the signal from said microphone is used to verify that the proper programming has been broadcast.

20. A digital broadcast station according to claim 15 where the signal from said microphone is used to adjust the gain of the audio output signal fed to said loudspeakers.

21. A method for broadcasting information that allows the broadcast content and broadcast schedule to be modified from a central controller comprising the following steps:

any combination of music, videos, audible advertisements, and visual advertisements in a digital broadcast station, wherein the digital broadcast station comprises a computer, a microphone, and one or more loudspeakers;

broadcasting the music, videos, audible advertisements, and visual advertisements stored in the digital broadcast station according to a broadcast schedule created at the central controller, wherein the digital broadcast station is operable to exercise selective local control of broadcasting the music, videos, audible advertisements, and visual advertisements;

monitoring the music, videos, audible advertisements, and visual advertisements broadcast by the digital broadcast station;

transmitting periodically information that indicates whether or not the digital broadcast station is operating properly to the central controller;

transmitting periodically a log of the music, videos, audible advertisements, and visual advertisements that have been broadcast by the digital broadcast station during a certain period of time to the central controller;

receiving information from the central controller, the information consisting of music, videos, audible advertisements, and visual advertisements and/or information, that changes the broadcast schedule; and storing the received information in the digital broadcast station.

22. A method according to claim 21 where the received information and the stored information is encrypted.

23. A method according to claim 21 where the received information consist of text files that are translated using a speech-to-text system.

24. A method according to claim 23 where the text files are advertisements that can be produced instantaneously.

25. A method according to claim 23 where the text files announce or describe the broadcast programming.

26. A method according to claim 21 where the broadcast volume is determined by the environmental conditions.

27. A method according to claim 21 where the audible component and the visual component of the broadcast is coordinated to accentuate an advertisement(s) and/or entertainment.

28. A method for administering a plurality of customizable digital broadcast stations capable of broadcasting stored information using a central controller comprising the following steps:

storing programming comprising any combination of music, videos, audible advertisements, and visual advertisements in a program database;

downloading information to one or more of the digital broadcast stations determined in accordance with one or more statistical profiles corresponding to one or more venues in which the one or more digital broadcast stations are installed, wherein each broadcast station of the plurality of digital broadcast stations comprises a computer, a microphone, and one or more loudspeakers; and the one or more digital broadcast stations each operable to exercise selective local control in the broadcasting in accordance with the downloaded information at least a portion of the programming stored in the program database and according to a schedule determined by the downloaded information.

29. A method according to claim 28 where the downloaded information consist of any combination of music, videos, audible advertisements, and visual advertisements stored in the program database.

30. A method according to claim 28 where the downloaded information alters the broadcast schedule of one or more of the digital broadcast stations.

31. A method according to claim 28 where the downloaded information is encrypted.

32. A method according to claim 28 where the downloaded information consist of text files that are translated using a text-to-speech system.

33. A method according to claim 32 where the text files are advertisements that can be produced instantaneously.

34. A method according to claim 32 where the text files announce or describe the broadcast programming.

35. A method according to claim 28 where the downloaded information is sent to a group of digital broadcast stations that share a specified characteristic(s).

36. A method for distributing advertisements to a plurality of digital broadcast stations comprising the following steps:

compiling a station demographic database that comprises one or more statistical profiles corresponding to one or more venues in which the plurality of digital broadcast stations are installed, wherein each broadcast station of the plurality of digital broadcast stations comprises a computer, a microphone, and one or more loudspeakers;

specifying a target audience of one or more advertisements;

selecting one or more digital broadcast stations of the plurality of digital broadcast stations to broadcast the advertisement and a schedule of when the one or ore selected digital broadcast stations will broadcast in accordance with the specified target audience and the one or more statistical profiles of the station demographic database, wherein each digital broadcast station is operable to download said advertisement and schedule and exercise selective local control in the playing of said advertisement in accordance with said downloaded schedule; and distributing advertisements to the selected digital broadcast stations.

37. A method according to claim 36 where the selected digital broadcast stations share a specified characteristic(s).

38. The apparatus of claim 1, wherein said central controller selectively controls content and scheduling of said plurality of digital broadcast stations by providing to each digital broadcast station of the plurality of digital broadcast stations at least some portion of the programming of the program database and a schedule of when the at least some portion of the programming is to be broadcast in accordance with a statistical profile of the one or more statistical profiles corresponding to a venue in which the digital broadcast station is installed.

* * * * *

UNITED STATES PATENT AND TRADEMARK OFFICE
CERTIFICATE OF CORRECTION

PATENT NO. : 6,507,764 B1
APPLICATION NO. : 09/281086
DATED : January 14, 2003
INVENTOR(S) : Parrella et al.

Page 1 of 1

It is certified that error appears in the above-identified patent and that said Letters Patent is hereby corrected as shown below:

(1) On the Title Pg, item (75), Inventors, the name of the first named inventor is misspelled and should be changed from "Micahel J. Parrella" to --Michael J. Parrella--.

(2) On the Title Pg, item (56), References Cited, ten (10) U.S. Patents were omitted in the section entitled "U.S. Patent Documents". Thus, they should be added in the section entitled "U.S. Patent Documents" as follows:

| | | | |
|---|---|---|---|
| 5,726,909, | 03/1998 | Krikorian.......... | 700/94 |
| 5,283,639, | 08/1995 | Esch et al. ...... | 348/6 |
| 5,446,919, | 08/1995 | Wilkins.......... | 455/6.2 |
| 5,758,257, | 04/1998 | Herz et al. ...... | 455/2 |
| 5,784,095, | 07/1998 | Robbins et al. .. | 348/6 |
| 5,810,603, | 09/1998 | Kato et al. ....... | 434/307 |
| 5,838,314, | 11/1998 | Neel et al. ....... | 345/327 |
| 5,913,039, | 06/1999 | Nakamura et al. | 395/200.61 |
| 5,914,712, | 06/1999 | Sartain et al. ... | 345/327 |
| 5,963,645, | 10/1999 | Kigawa et al. ... | 380/10 |

Signed and Sealed this

Seventh Day of July, 2009

JOHN DOLL
*Acting Director of the United States Patent and Trademark Office*